(12) United States Patent
Harada (10) Patent No.: US 6,446,886 B2
(45) Date of Patent: Sep. 10, 2002

(54) METHOD FOR PRODUCING GLASS SANDS AND SYSTEM THEREFOR

(75) Inventor: Yoshinori Harada, Yamagata-ken (JP)

(73) Assignee: Kaneto Co., Ltd., Kaminoyama (JP)

( * ) Notice: Subject to any disclaimer, the term of this patent is extended or adjusted under 35 U.S.C. 154(b) by 0 days.

(21) Appl. No.: 09/754,143

(22) Filed: Jan. 5, 2001

Related U.S. Application Data (62) Division of application No. 09/404,140, filed on Sep. 27, 1999, now Pat. No. 6,250,576.

(30) Foreign Application Priority Data

Sep. 30, 1998 (JP) ............................................. 10-277795

(51) Int. Cl.$^7$ ............................................... B02C 19/12
(52) U.S. Cl. ................... 241/19; 241/24.14; 241/24.15; 241/24.22; 241/24.3
(58) Field of Search ...................... 241/79.1, 99, 24.14, 241/24.13, 24.15, 24.3, 24.22, 19

(56) References Cited

U.S. PATENT DOCUMENTS

| | | |
|---|---|---|
| 5,775,604 A | 7/1998 | Sato |
| 6,073,866 A | 6/2000 | Silver et al. |

*Primary Examiner*—Mark Rosenbaum
(74) *Attorney, Agent, or Firm*—Wenderoth, Lind & Ponack, L.L.P.

(57) ABSTRACT

A method for producing glass sands including the steps of crushing glass articles to convert them into fine fragments so as to form glass fragments, then agitating finely crushed glass fragments to eliminate sharp portions while at the same time forming glass fragments into glass sands with a predetermined granular configuration, then sieving foreign materials which have been entrapped into glass sands formed in a granular configuration, while at the same time sorting out glass sands according to their grain sizes.

2 Claims, 9 Drawing Sheets

METHOD FOR PRODUCING GLASS SANDS AND SYSTEM THEREFOR

This is a divisional application of Ser. No. 09/404,140, filed Sep. 27, 1999, now U.S. Pat. No. 6,250,576.

BACKGROUND OF THE INVENTION

The present invention relates generally to a method and system for crushing glass articles such as glass bottles etc., for disposal, and particularly to a method and apparatus for forming glass sands which may be effectively used as aggregates for road pavement, colored paving materials for walkways, traffic controlling white line markers to be applied on an asphalt cross-walk, various grinding materials, matrix material for potters, construction materials such as outer walls, block materials and in other application, in substitution for natural sands, by crushing glass articles for a disposal purpose.

Traditionally it has been a common process to crush used glass bottles etc., and use them as a material for reclaiming glass bottles etc., while discharging other portions which have been finely crushed together with a washing water so that they may be disposed as industrial waste materials. However, it has been proved to be advantageous if such stock materials which have been disposed as industrial waste materials so far after they are crushed into fine fragments is used as aggregates for road pavement, colored paving materials for walkways, traffic controlling white line markers to be applied on an asphalt cross-walk, various grinding materials, matrix material for potters, construction materials such as outer walls, block materials and in other application, in substitution for natural sands which have been used extensively.

In a current situation in which an excavation of natural sands may accelerate the environmental destruction and ruin the natural ecology, such production of glass sands come to play a vital role in preventing the destruction of nature.

Consequently, the applicant has disclosed a novel method and apparatus for producing glass sands from glass bottles etc., which can be used effectively in substitution for natural sands, while ensuring an easy handling without the risk of piercing operators' hands etc., by processing them such that sharp crushed edges may be changed into smooth crushed surfaces (see U.S. Pat. No. 5,775,604, Japanese Patent Application Laid-open No. 9-99250).

Figure 15:
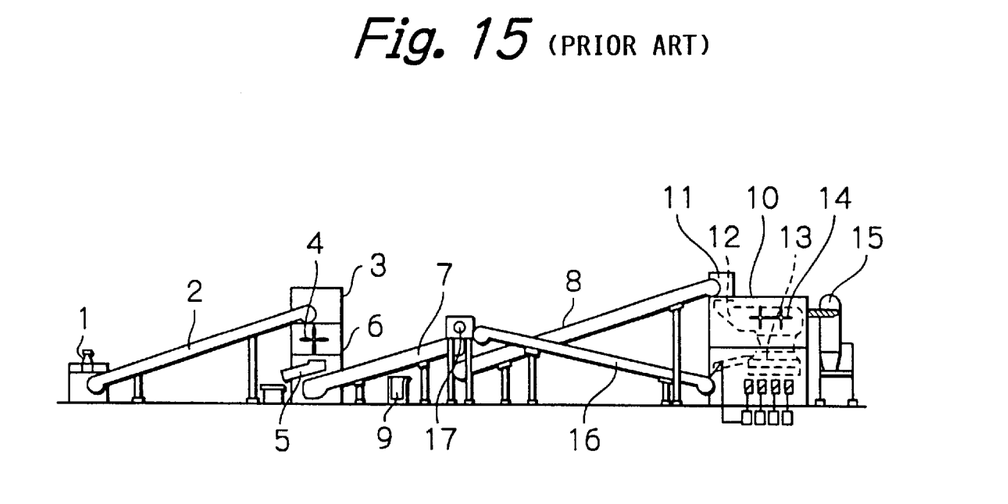
FIG. 15 is a general side view showing the first embodiment of a prior art glass sand-producing device.

In this prior art, as shown in FIG. 15, the glass articles 1 such as glass bottles etc., are supplied by means of first transfer device 2 into a primary crusher 3 where the glass articles 1 are crushed by means of crushing means 4, and then delivered to a underlying delivery section 6 via a sorter 5. The sorter 5 is adapted to sort out papers such as labels etc., and metallic or cork-made caps etc., which would stick to the glass articles that have been crushed, as well as glass fragments which have been insufficiently crushed to retain dimensions larger than those specified in the crusher 3, and then to discharge them out of the primary crusher 3.

The crushed articles 7 which have fallen into the delivery section 67 are then supplied to a secondary transfer device 8 by means of magnetic screening-transfer device 7. At this step, iron caps, nails and other ferrous fragments, which might be entrapped, may be removed into a ferrous-fragment container 9, by means of magnetic screening-transfer device 7. Then, crushed articles are fed into a secondary crusher 10.

In this secondary crusher 10, a container section 11 receives crushed articles and a crushing section may act to crush the glass material into finer fragments. Finally, sieving means 13 sort and deliver the articles which have been crushed, according to their grain sizes. The secondary crushing means 14 in the secondary crusher 10 are designed such that a blade may be arranged with a space narrower than that in the crushing means 4 of the primary crusher 3 and/or that it may rotate with a higher number of rotation. Furthermore, the crusher is equipped with a dual crushing means as shown in the drawing and may crush the glasses into fragments smaller than those of glass articles as crushed in the primary crusher, while at the same time rubbing glass fragments against each other so as to form approximately a spherical configuration and change sharp edges of these glasses which have been crushed into smooth ones. The secondary crusher 10 is connected with a dust collector 15. The sieve means 13 serves to return the glass powder which has not passed through the uppermost sieve back to the secondary crusher 10 by means of return transfer device 16 and secondary transfer device 8. The glass powders with approximately round crushed surfaces which have not passed through the sieve in the next lower stage-sieve may be used in substitution for natural sands on the walkway, and the glass powders which have not passed through a further lower stage-sieve may be suitably applied, for example, as aggregates of asphalt. Moreover, the glass powders which have passed through this sieve may find its' application as construction materials, grinding materials or road paving materials. The glass articles dropped from the sieve device without passing through each of sieves are transferred to a paper-sorter 17 via a return/transfer device 16 just in the same way as that for the glass articles which have not passed through the first sieve, where they are separated into glass articles and labels etc., and then returned back to the secondary crusher 10 again by means of secondary conveyor 8. By repeating such actions as above-described, the glass sands which are sorted into three classes may be produced, depending on their grain-sizes.

Figure 16:
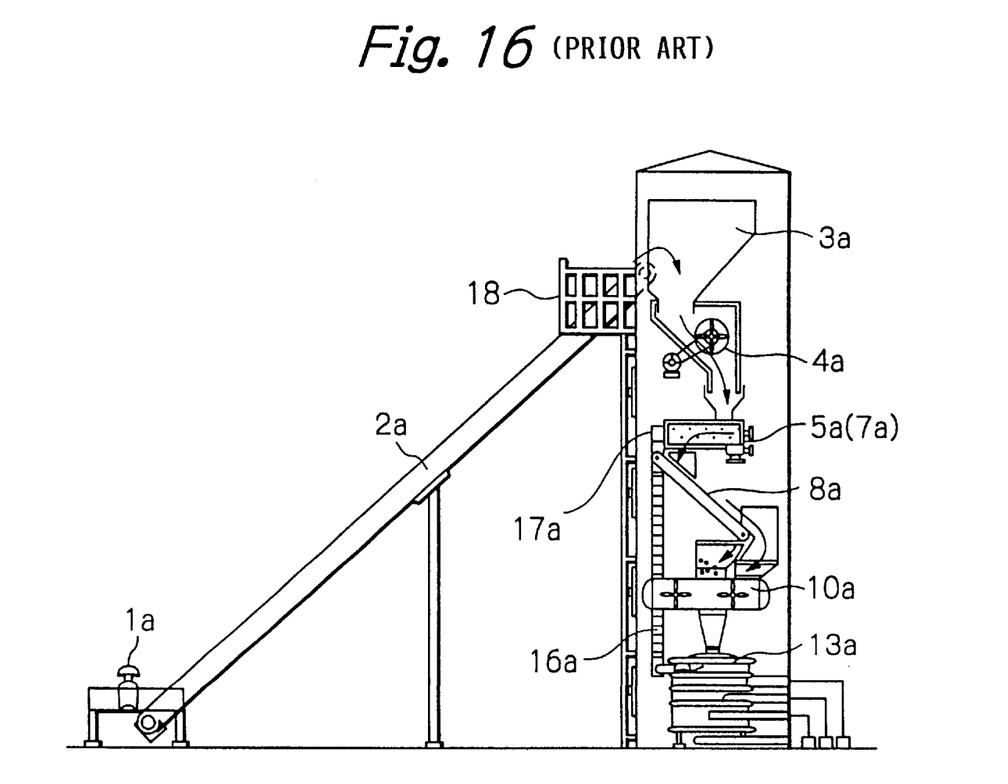
FIG. 16 is a general side view showing an alternative embodiment of the prior art glass sand-producing device.

FIG. 16 is a view disclosing an entire system which is arranged from the first crusher to the secondary crusher in a vertical configuration. Since each of the units is substantially identical to those as shown in FIG. 15, they are indicated by the same reference numerals of FIG. 15 with the letter "a" affixed. The glass articles 1a such as the glass bottles etc., are supplied to the primary crusher 3a by means of first transfer device 2a and caused to be crushed under action of the crushing means 4a such as rotor etc. Subsequently, the glass articles are supplied to the secondary transfer device 8a via the sorter 5a (7a), and then transferred into the secondary crusher 10a where they are crushed into finer fragments, and finally are sorted and discharged by sieve means 13a according to their grain sizes. In the meantime, reference numerals 16a and 17a represent a return/transfer device and a paper sorter respectively. There is landing 18 which is used by the operator during maintenance of the system. Since working operations are carried out while the articles are being moved by gravity from upper portion to lower portion in the embodiment as shown FIG. 16, there may be an additional advantage in that less power is required to operate the system in comparison with the embodiment in FIG. 15.

However, in the known method for producing glass sands as above-described, a device is utilized as the secondary crusher 10 which may crush glass fragments which have been previously crushed by the primary crusher 3 to a certain degree, and thus there is a limit on sizes of glass fragments which may be supplied from the primary crusher 3 into the secondary crusher 10 resulting in that a sorter 5 must be arranged below the primary crusher 3 so as to sort and exclude glass fragments of certain sizes (ex. 20 mm) or greater so that they may are not be supplied to the secondary sorter 10.

Additionally, the secondary crusher 10 in the known system has its internal surface formed by plying ceramic materials which have improved resistance against abrasion so that it may not be damaged by sharp glass edges which have been crushed by means of primary crusher 3. However, ceramic materials are very vulnerable to shock. Thus, if metallic materials are accidentally entrapped into this secondary crusher 10, the metallic materials may be repulsed by the secondary crushing means 14 so as to impinge against the ceramic surface, and thus ceramic material surfaces can be easily damaged. Therefore, there arises a need to reliably remove metallic foreign objects such as caps and nails etc., from the glass fragments to be introduced into the secondary crusher 10, resulting in that a magnetic screening device etc., must be installed.

Furthermore, the necessity for such ancillary equipment creates a problem that the entire system becomes bulky and expensive.

SUMMARY OF THE INVENTION

To solve the above-described problem, the present invention provide a method for producing glass sands, in which the method comprises steps of crushing the glass articles into finer glass fragments, agitating such glass fragments which have been finely crushed and treating glass fragments so that they contain no sharp edges while at the same time forming glass fragments into glass sands with predetermined grain-sizes, then, sieving foreign materials which have been entrapped into glass sands which have been formed as grains while simultaneously sorting glass sands according to their grain-sizes.

BRIEF DESCRIPTION OF THE DRAWINGS

Other characteristics and advantages of the present invention will appear from the description which follows of preferred embodiments, given by way of illustration and without limitation, in which.

DETAILED DESCRIPTION OF THE INVENTION

Figure 1:
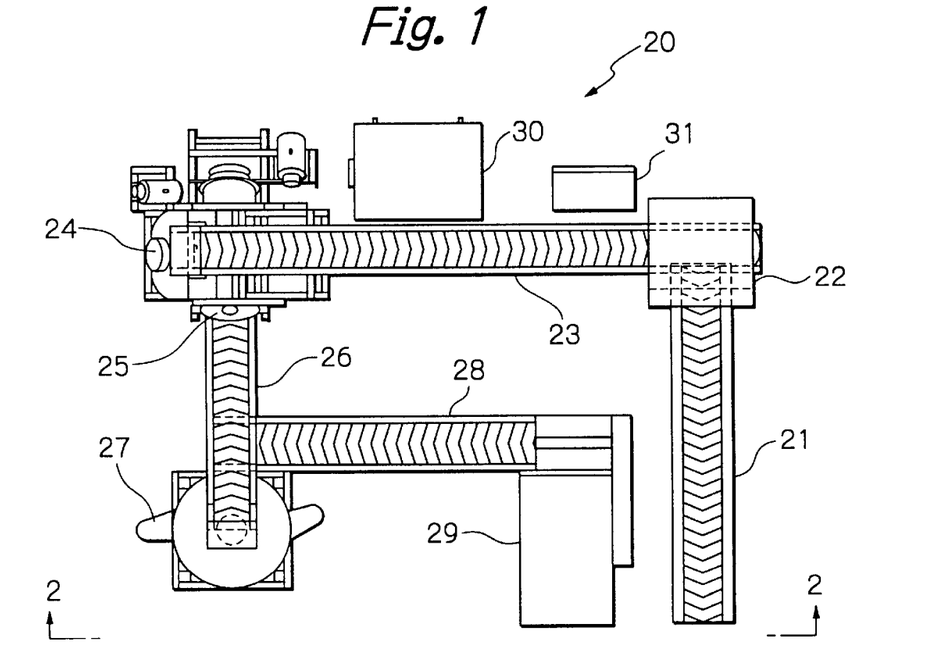
FIG. 1 is a general plan view of the device for producing glass sands in accordance with the present invention.
Figure 2:
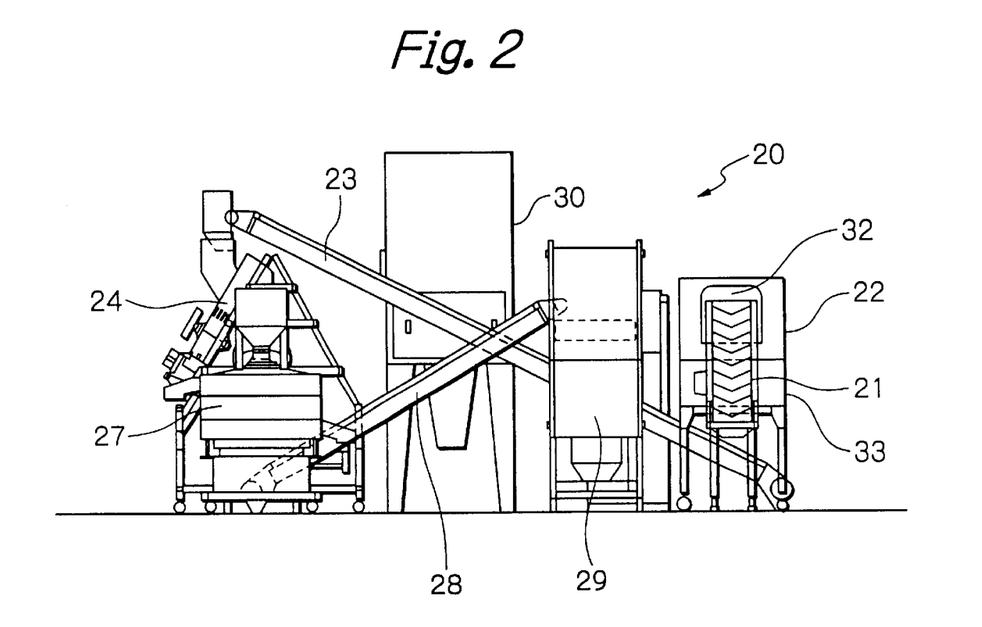
FIG. 2 is a perspective view taken along the line 2—2 in FIG. 1, showing the general side view of the device for producing glass sands in accordance with the present invention.

FIG. 1 is a general plan view of the system in accordance with the invention, and FIG. 2 is a perspective view taken along line 2—2 in FIG. 1. The system 20 of the present invention for use to produce glass sands by disposing waste glass bottles and other glass fragments comprises a first supplying conveyor 21 for supplying used waste glass articles (not shown), a primary crushing device 22 which receives waste glass articles to be supplied from the first supplying conveyor 21 so in to crush them as a primary crushing operation, a secondary supplying conveyor 23 for supplying glass fragments with sharp crushed edges which have been crushed by means of primary crushing device 22, a secondary crushing device 24 which receives glass fragments to be supplied from the secondary supplying conveyor 23 and crushing them into finer grains in a secondary crushing operation, agitating device 25 for agitating glass fragments which have been crushed by the secondary crushing device 24 and for rubbing such glass fragments against each other to process them to change sharp crushed edges of the glass fragments into smooth ones, and thereby creating glass sands substantially of spherical configuration, a third supplying conveyor 26 for supplying glass sands which have been agitated and formed by the agitating device 25, a grain-size sorter 27 for receiving glass sands to be supplied from the third supplying conveyor 26 and sorting them by their grain-sizes, a fourth conveyor 28 for feeding a mixture of glass fragments which have been sorted by means of sorter 27, metallic foreign materials such as metallic caps and nails, and other foreign materials such as cork and labels etc., and a wind-operated sorter 29 for receiving the mixture that has been supplied from the fourth conveyor 28 and sorting them utilizing wind power.

Reference numerals 30 and 31 represent a dust collector and a switch board respectively. The dust collector 30 may act to collect dusts and debris which may be produced during primary and secondary crushing actions carried out in the primary crushing device 22 or the secondary crushing device 24, and additionally debris which may be created during sorting operation of the sorter 27 as well as debris which may be screened from the wind-operated type sorter 29. The switch board 31 may control power sources for respective devices and conveyors etc. They may be arranged variably to match suitably to an installation space of the system.

In the description to follow, the glass sand-producing system 20 of the present invention will be described with reference to an aspect in which it differs from the known device as shown in FIG. 15. In the system 20 of the present invention, used waste glass articles (not shown) are washed to a certain degree, and excess foreign materials are removed as far as it may permit, and then these glass articles are loaded onto the first supplying conveyor 21. The first supplying conveyor 21 is substantially identical in its construction and performance with those of the first transfer device 2 as shown in FIG. 15. The primary crushing device 22 of the system 20 of the present invention is a device adapted to receive glass articles which are supplied from the first supplying conveyor 21 and perform a primary crushing operation, providing substantially the same operation as that of first transfer device 2 as shown in FIG. 15. However, the primary crusher is slightly different from the first transfer device in its construction and performance. The primary crushing operation mentioned herein means a step in which glass articles are pre-crushed prior to the full crushing operation to be undertaken by the secondary crushing device which crushes the glass articles by means of a rotary blade and a fixed blade. Thus, when the glass fragments which have been crushed to a certain degree at the stock yard etc., are supplied, and in other applications, the primary crushing device 22 and the first supplying conveyor 21 may be dispensed with.

The primary crushing device 22 comprises a receiving inlet 32 (see FIG. 2) at its upper portion for receiving glass articles which are to be supplied from the first supplying conveyor 21. Arranged below the inlet 32 is a primary crushing chamber 33 in which crushing means are freely rotatably accommodated to provide the same function as that of crushing means 4 such as rotor and the like in FIG. 15. Furthermore, an outlet (not shown) is provided below the primary crushing chamber 33, through which glass fragments which have been crushed in the primary crushing step are supplied to the secondary supplying conveyor 23 while they retain glass fragments with sharp crushed edges. In the case of the primary crushing device 22 of the present system 20, there is no sorting unit which corresponds to the sorter 5 or a magnet-screening/transfer device 7 as shown in FIG. 15. Thus, a sorting operation is not effected for papers such as labels which are adhered to the glass fragments, or metallic or cork caps, and furthermore glass fragments which have been crushed only insufficiently to retain their dimensions greater than standards may not be sorted out. They are all put into the hopper 35 of secondary crushing device 24 from the secondary supplying conveyor 23, all as they are.

Figure 3:
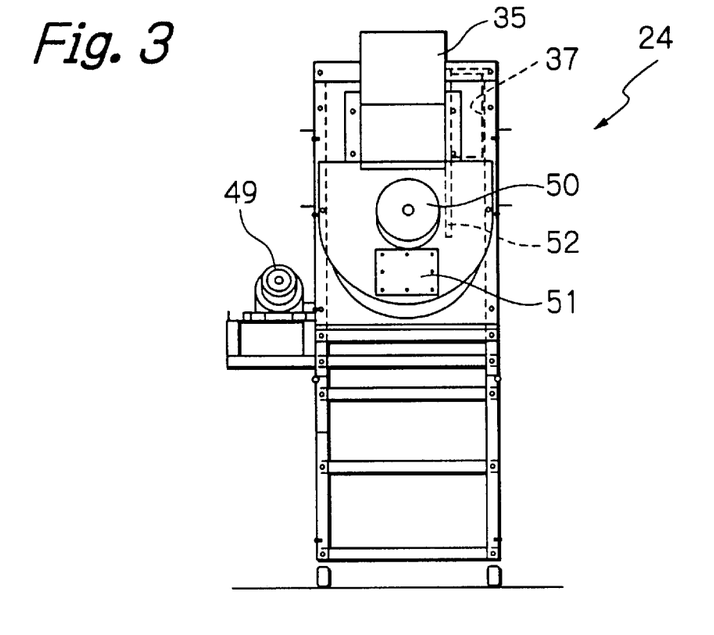
FIG. 3 is a front elevation of the secondary crushing device in accordance with the present invention.
Figure 4:
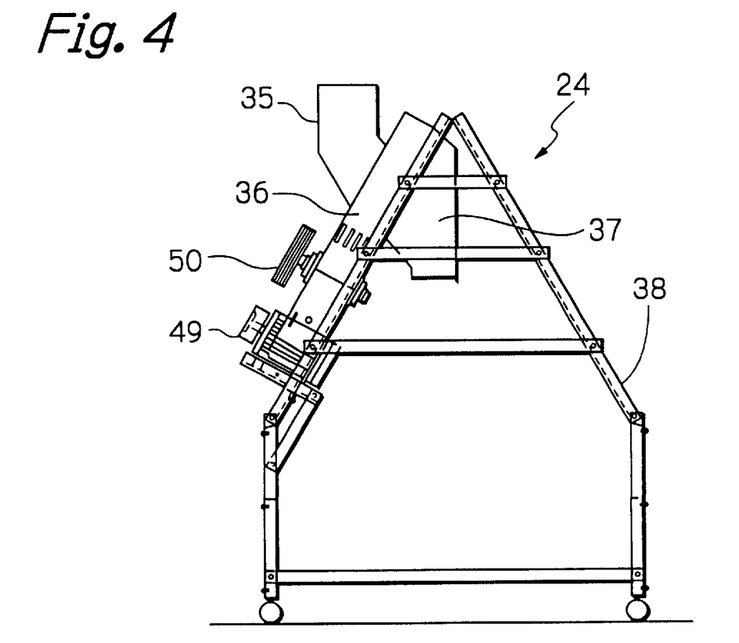
FIG. 4 is a side view of the secondary crushing device in accordance with the present invention.

The secondary crushing device 24 comprises, as shown in FIG. 3 and FIG. 4, a hopper 35, a secondary crushing chamber 36 in which a secondary crushing operation is carried out for crushing articles that have been received in the hopper 35, an exhaust outlet 37 from which crushing articles that have been crushed a secondary step in the secondary chamber 36 may be discharged, and a holding table 38 which acts to retain the secondary crushing device 24. The secondary crushing chamber 36 is preferably arranged with an inclination angle of approximately 20–45° relative to a vertical surface, by means of the holding table 38, as shown in FIG. 4. This is for the reason that it may permit a gravity-relied secondary crushing operation.

Figure 5:
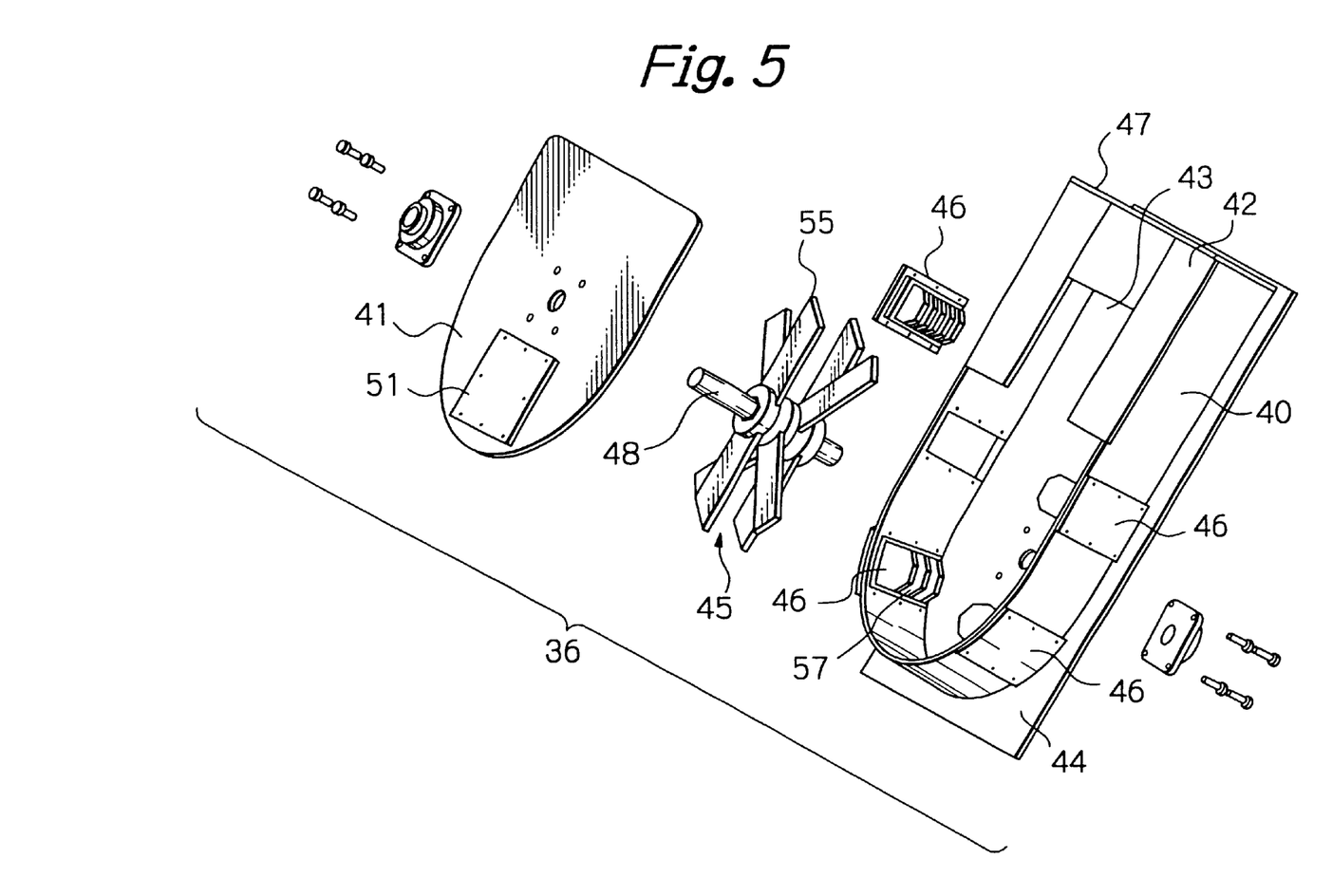
FIG. 5 is an exploded perspective view showing the secondary crushing chamber which constitutes the secondary crushing device in accordance with the present invention.

The secondary crushing chamber 36 comprises, as shown in FIG. 5, a housing side wall 40 of substantially U-shaped configuration, a front panel 41 which closes a frontal lower portion of the housing side wall 40, a pair of flange plates each extending in the inward direction in which they oppose each other at the frontal upper portion of the housing, said flange plates 42 forming an opening 43 in its intermediate portion through which the hopper 35 may be received, a rear surface panel 44 which closes the rear surface of the housing side wall 40, a rotary blade 45 which is rotatably accommodated in a housing which is formed by the housing side wall 40, frontal panel 41 and the rear surface panel 44, a plurality of fixed blades 46 arranged on the inner surface of the housing side wall 40, and a closure panel 47 which acts to close the upper portion of the housing side wall 40 to prevent debris and dusts from entering though the upper portion.

The frontal panel 41 is provided with a bore through which the shaft 48 of the rotary blade 45 extends, and a bearing for receiving the shaft 48. The shaft 48 is provided at its end with a pulley 50 which is driven to operate via a V-belt (not shown) by an actuating device 49 (see FIG. 3 and FIG. 4) which is separately arranged. The opposite end of the shaft 48 of the rotary blade 45 is similarly retained in position by means of bore and bearing that are defined in the rear surface panel 44. The frontal panel 41 is also bored with an inspection hole 51.

The rear surface panel 44 is formed at its upper right-handed portion with an exhaust opening 37 (not shown). The exhaust opening 37 is defined by a guide panel 52 (see FIG. 3) which extends from the closure panel 47 to a position closer to an area where the rotary blade 45 rotates, and may prevent the crushed articles which have charged through the hopper 35 from being discharged through the exhaust opening 37 without being subjected to the secondary crushed step. Therefore, the crushing articles which have been charged into the hopper 35 poured to the left side of the guide plate 52, in FIG. 3, and only the secondary crushed articles which have been subjected to the secondary crushing step with the rotary blade 45 may pass through the right-handed side of the guide plate 52 and are discharged through the exhaust opening 37.

The rotary blade 45 is formed, for example, from four rotor blades 55 each being arranged with a predetermined spacing therebetween. These rotor blades 55 are formed from a specially hardened steel. On the other hand, the fixed blade 46 is formed, for example, from four blades each being arranged with a predetermined spacing therebetween in the area where the rotary blade may rotate, in the example as illustrated. Each of fixed blades 46 has grooves 57 through which the tip end of the rotor blade 55 may rotate and pass therethrough. The number of these grooves 57 may be suitably varied; it may be, for example, four in the first fixed blade and three in the second fixed blade. Alternatively, the number of grooves in all fixed blades may be made equal. Each of fixed blades 46 may preferably be secured in position by means of bolts etc., so as to allow replacement, by suitably inserting a new one into the side wall of the housing, when the blade 46 is worn out.

The secondary crushing device 24 may strike articles such as metallic fragments, paper fragments such as labels and corks to be supplied from the first crushing device 22 together with the glass fragments by means of rotary blade 45 and fixed blade 46 in the secondary crushing chamber 36. Thus, the glass fragments are crushed into finer fragments, while metallic fragments are collapsed and labels etc., are peeled off the glass surfaces. The side wall 40, the frontal panel 41, the rear surface panel 44 and the like which forms the housing are formed from a special steel material with improved wear-resistant and shock-resistant characteristics. Therefore, even if the metallic fragments collide against the side wall of the housing etc., while being in a collapsed condition, the side wall of the housing and the like will not be damaged significantly. A centrifugal force is urged due to rotation of rotary blade 45 of the secondary crushing device 24, and thus the glass fragments and the like may collide against each other in the secondary crushing chamber 36, resulting in that they are fragmented. Thereafter, the crushing materials which have been crushed by the secondary crushing device 24 under the scraping action of the rotary blade 45 pass by the right-handed side of guide plate 52 in FIG. 3 and are discharged through the discharge outlet 37 in the secondary crushing chamber 36 and then supplied to the agitating device 25.

Figure 6:
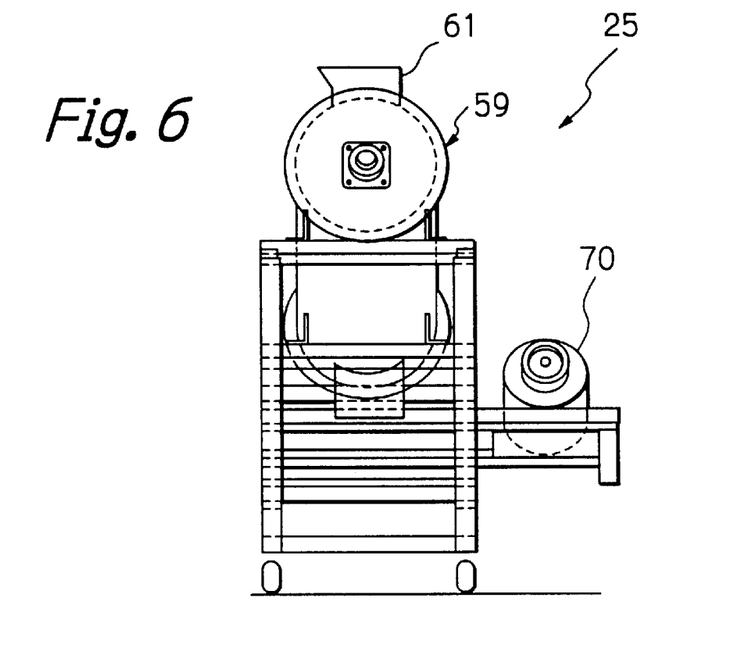
FIG. 6 is a front elevation of the agitating device in accordance with the present invention.
Figure 7:
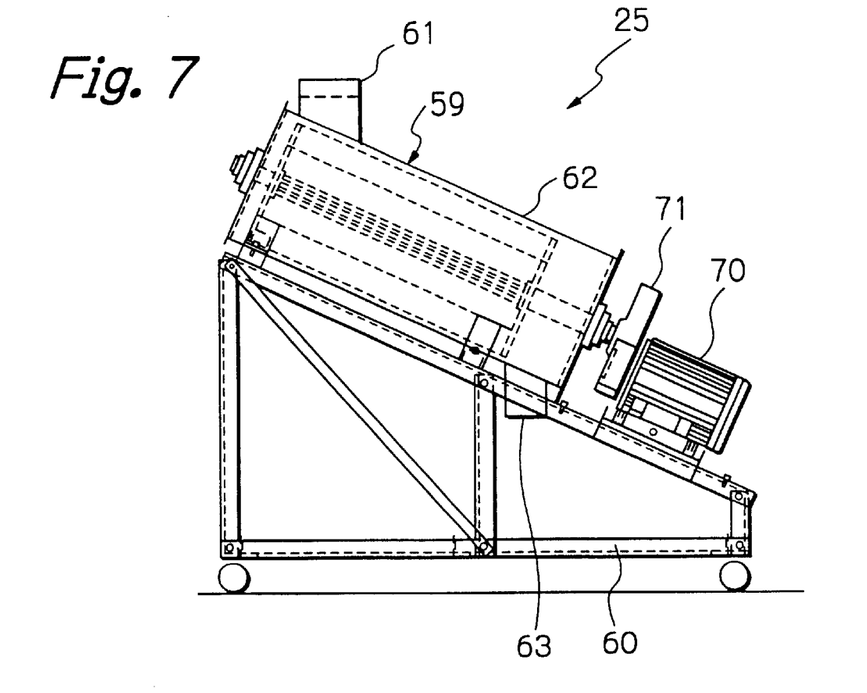
FIG. 7 is a side view of the agitating device in accordance with the present invention.
Figure 8:
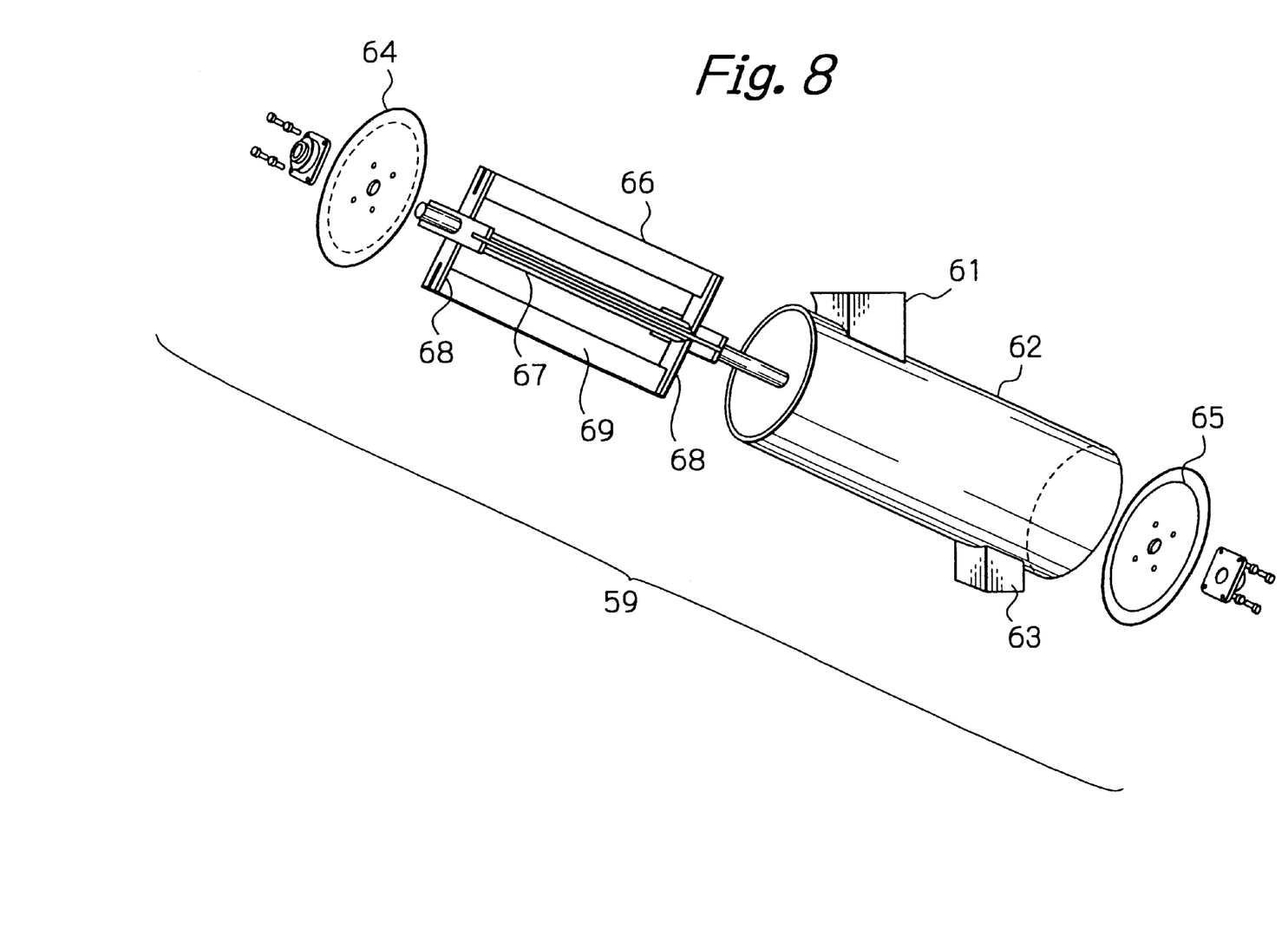
FIG. 8 is an exploded perspective view showing the agitating device in accordance with the present invention.

The agitating device 25 is formed from an agitating chamber 59 and holding table 60 upon which the agitating chamber 59 is retained, as shown in FIG. 6 and FIG. 7. The agitating chamber 59 is formed from a hopper 61, a main body 62 acting to agitate the secondary crushed material received by the hopper 61, and a discharge outlet 63 through which the crushed material may be discharged after being agitated in the main body 62 and processed in such a manner that the materials fragments may be rubbed against each other so that sharp edges may be changed into smooth ones. The agitating chamber 59 is arranged to incline approximately with an angle of 20–45° relative to a horizontal plane, by means of the holding table 60, as shown in FIG. 7. This inclination angle should preferably be made smaller than that of the secondary crushing device 24 relative to the vertical plane.

The agitating chamber 59 has a main body 62 of substantially cylindrical shape, and is closed at its opposite ends by an upper lid 64 and a lower lid 65. An agitating body 66 is accommodated in the main body 62. The agitating body 66 is formed from a central rotary shaft 67, a pair of lugs 68, each forming a cross-shape which extends at a normal angle towards each other with a predetermined spacing therebetween from a position adjacent to its opposite ends in a radially outward direction, and four agitating blades 69 made from a special hardened steel which extends in parallel with the axial direction of the rotary shaft 67 and has its end fixed in position on the tip end of the lug 68. The rotary shaft 67 is rotatably retained in position by a bearing, and the shaft extends outwardly from the main body 62 via a bore defined in the central portion of upper lid 64 and lower lid 6 respectively. The bearing is threaded lid 64 and lower lid 65 in position on the upper lid 64 and the lower lid 65. The rotary shaft 67 is provided at its lower end with a pulley 71 which may be actuated via a V-belt (not shown) and the like by means of actuating device 70 (see FIG. 6 and FIG. 7) which is separately arranged. Thus, the agitating body 66 is made to be freely rotable. In the meantime, in the embodiment illustrated in the drawing, the agitating blade 69 is formed as a straight blade, but it may be made as a curved blade as needed. By making the agitating blade as a curved blade, the agitating chamber 59 may be mounted horizontally, and thereby allowing easy installation. In this case, a pair of lugs 68 is arranged in a twisted configuration relative to the rotary shaft 67. Furthermore, the number of agitating blade is not limited to four, but a greater or less number may be selected.

The function of the agitating device 25 is to form the glass fragments substantially in a spherical configuration by reliably eliminating sharp portions which have been formed by the secondary crushing device 24. Thus, fine glass fragments with sharp portions are caused to rotate by agitating body 66 in the agitating chamber 59, together with other foreign materials. At this moment, sharp portions of the glass fragments are made to rub against the inner wall of the main body 62 to abrade the sharp portions, and thus glass sands are completed substantially in a spherical configuration with smooth angular portion.

In this case, it may be possible to adjust several factors including radial dimensions of the lug 68 and main body 62, the inclination angle of the agitating device 25, and the rotating speed of the agitating body 66 etc., and thereby allowing one to increase an amount of glass powders or reduce roundness of individual sands, so as to produce glass sands in accordance with a preference of end users.

Figure 9:
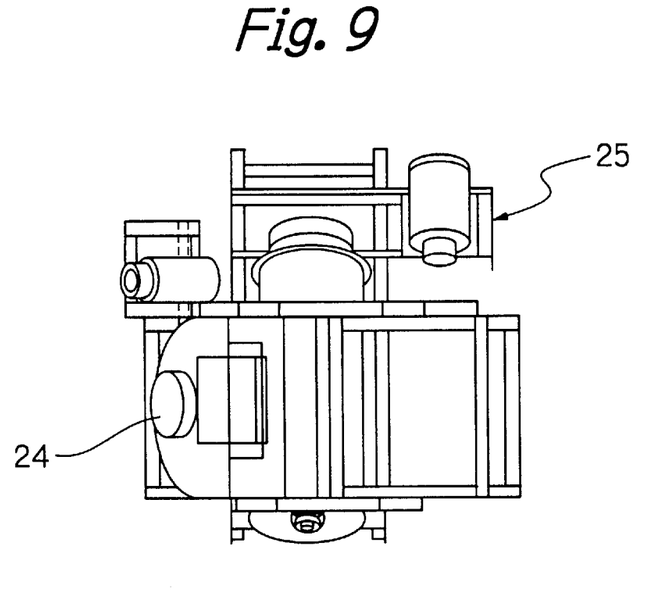
FIG. 9 is a plan elevation showing how the secondary crushing device may be combined with the agitating device in accordance with the present invention.
Figure 10:
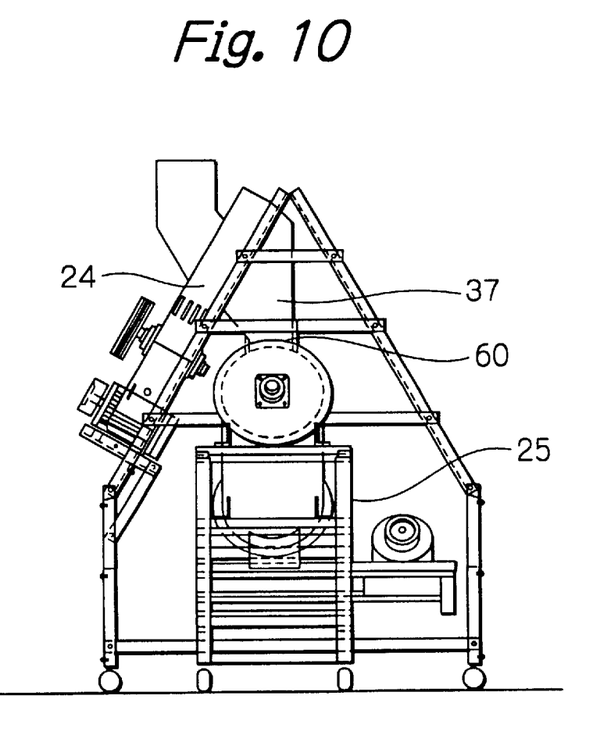
FIG. 10 is a side view showing how the secondary crushing device may be combined with the agitating device in accordance with the present invention.

In the meantime, the combined operation of the secondary crushing device 24 and the agitating device 25 is preferable from the viewpoint of saving installation space. Consequently, FIG. 9 and FIG. 10 show one example of a preferable mode of combining the secondary crushing device 24 and the agitating device 25. In this arrangement, the secondary crushing device 24 is directly connected at its exhaust outlet 37 with the hopper 60 of the agitating device 25, and these two devices are arranged such that they may cross with other at their inclination angle. However, the present invention is not limited to this configuration, and one can freely select the mode of arrangement for respective devices.

The glass sands which have been sufficiently agitated by the agitating device 25 leave from the discharge outlet 62 of the agitating chamber 61, and then are supplied to the grid-sorter 27 via the third supplying conveyor 26. This grid-sorter 27 is constructed and operated substantially identically with sieving means 13 as shown in FIG. 15, and may sieve out the glass sands into, for example, three or more classes according to their grain sizes. That is, the glass sands which have been processed such that they have fine and smooth crushed edges by the agitating device 25 are supplied to a multi-stage sieving device which is being vibrated as known in the art, and then sieved out according to the size of sieve. This sieving device 27 may be formed, for example, from three stages of sleves, in which the uppermost sieve has the mesh size of approximately 5.0 mm, and the next-stage sieve has the mesh-size of approximately 2.5 mm, with subsequent lower sieves having the mesh-size of approximately 1.0 mm, like the sieving means 13 in FIG. 15. Foreign materials such as glass fragments, metallic fragments, cork and labels with approximately 5.0 mm or more dimensions which could not pass through the uppermost sieve are supplied to the wind-operated sorter 29 which is known per se., in which they are sorted by the wind, and metallic fragments and foreign materials are delivered out of the line. On the other hand, glass fragments are supplied to the first supplying conveyor 21. The glass powders which have passed through the uppermost sieve, but have not passed through the next lower-stage sieve, substantially having the size of 2.5 mm to 5.0 mm may be collected in a predetermined container. The crushed surfaces of glass sand products of these dimensions have substantially a round configuration due to a high-speed crushing and molding operation to be activated by the rotary blade and the agitating body, and thus may be most suitably applied as a substitute of natural sands on the walkway. The glass powers which have passed through the second-stage sieve, but has not passed through the next lower stage-sieve, having dimensions substantially in the range of 1.0 mm–2.5 mm may be collected in a separate container. The glass articles with such dimensions may be most suitably applied as aggregates of the asphalt. Furthermore, fragments of glass bottles with approximate dimensions smaller than 1.0 mm which have passed through this sieve may be collected in a separate container, and the glass powders thus collected in this container may be used as building materials, grinding or road-paving materials. The glass articles which have dropped from the sieving device 27 without passing through each of sieves during vibration may be collected into the container, and again returned back to the first supplying conveyor 21, just like the glass articles which have not passed through the first sieve.

Figure 11:
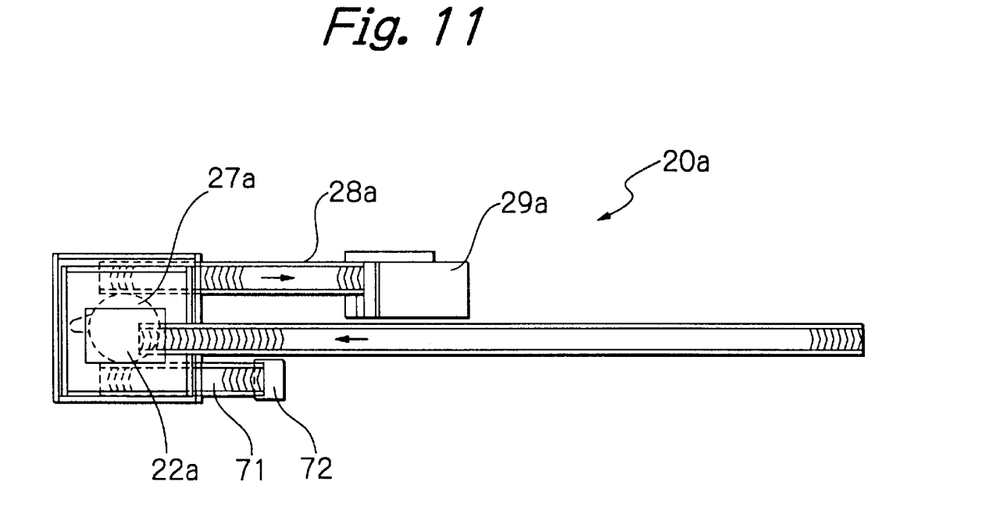
FIG. 11 is a plan elevation showing an alternative embodiment of the device in accordance with the present invention.
Figure 12:
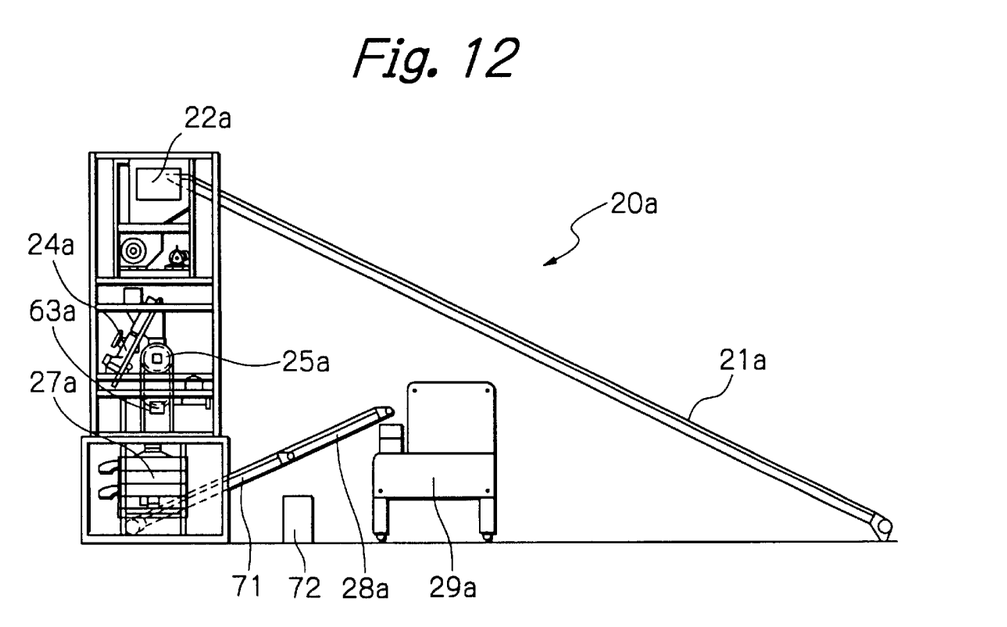
FIG. 12 is a side view in an embodiment shown in FIG. 11.

The embodiments in FIG. 11 and FIG. 12 show examples in which each unit, that is, a first crushing device, a secondary crushing device, a agitating device and grid-sorting device etc. are formed vertically as a series of laminated structure. Each of the devices which are used in this embodiment is constructed and operated in the same manner as those of embodiments shown in FIG. 1 to FIG. 10, and therefore the operation of this embodiment will be described using the same reference symbols as those used in the previous embodiments, excepting that the letter prime "a" is affixed.

Used glass bottles etc., are supplied by means of the first supplying conveyor 21a to the primary uppermost crushing device 22a in the glass sand-producing tower 20a which are arranged in a series laminated configuration, and in which a primary crushing step is carried out. Then, the glass materials drop by gravity from the primary crushing device 22a and are supplied to the secondary crushing device 24a in which the secondary crushing step is taken. Thereafter, the glass materials are charged into the agitating device 25a which is arranged directly below the secondary crushing device 24a, as shown in FIG. 9 or FIG. 10, in which they are agitated so as to be converted into predetermined shapes. Furthermore, the glass materials are transferred out of the exhaust outlet 63a of the agitating device 25a into the grid sorter 27a in which they may be sorted according to their grid sizes, and products are contained in predetermined product container 72 respectively via the product conveyor 71, while other foreign materials etc. are fed to the wind-operated sorter 29 by means of the fourth supply conveyor 28a in which they may sorted by mind.

Meanwhile, in the drawing, the primary crushing device 22a, the secondary crushing device 24a, the agitating device 25a and the grid-sorter 27a etc. are all formed as a vertical laminated construct. However, for reason of working space, working efficiency and the like, it will be obviously understood by those skilled in the art that at least one or two of these devices may be removed from this longitudinally laminated construction, and may be independently installed.

Figure 13:
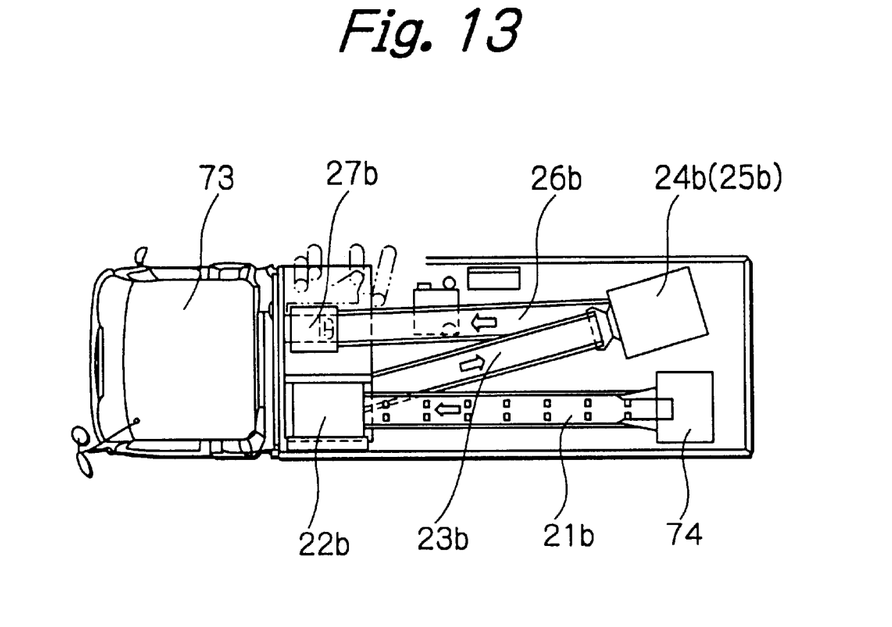
FIG. 13 is a plan elevation showing a further alternative embodiment of the device in accordance with the present invention.
Figure 14:
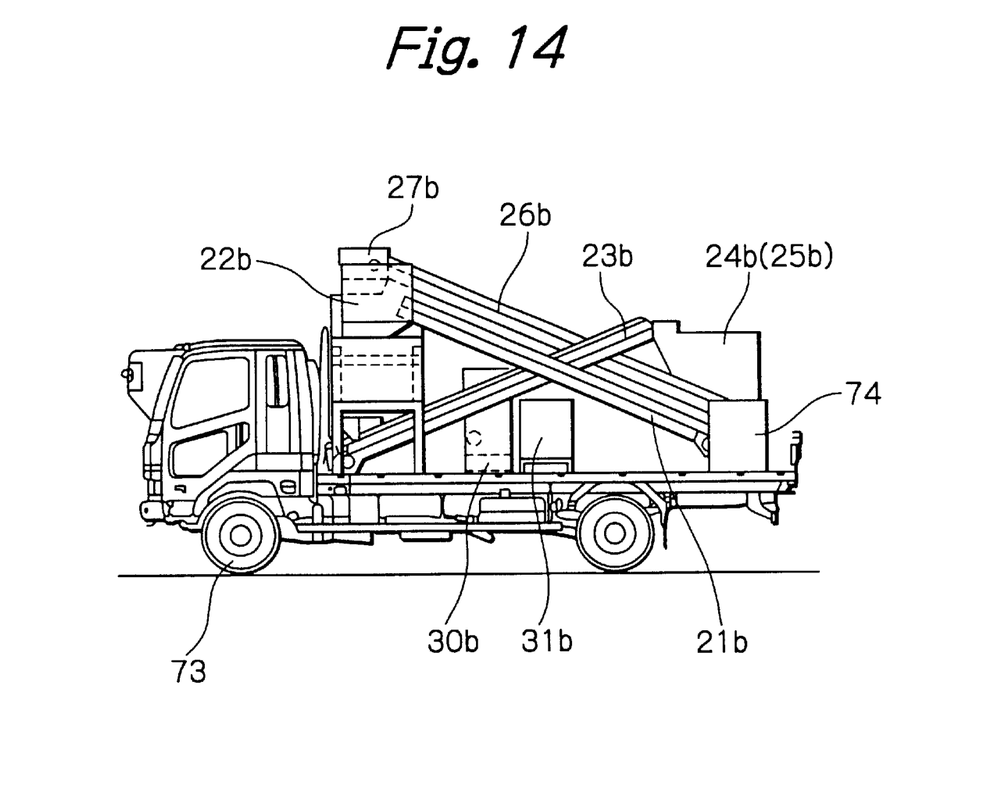
FIG. 14 is a side view of the embodiment shown in FIG. 13.

FIG. 13 and FIG. 14 show a further embodiment of the invention. While the previous embodiment as above-described are disclosed in terms of glass sand-producing system with an immovable configuration so as to be installed on the land, this embodiment discloses a type of glass sand producing device that can be loaded onto a transporting means 73 such as a known truck etc. In this embodiment, there is no need of having a special-purpose mill in which the glass producing system is installed, and thereby allowing one to produce glass sands at any arbitrary place in a straightforward manner, while at the same time permitting production of glass sands directly at the very work site where final products may be applied. Construction and operation of the devices used in this embodiment are substantially the same with those of embodiments as described in FIG. 1 to FIG. 10, and so the same reference numerals are used as those in the previous embodiments with the letter "b" affixed.

Used bottles and the like are then supplied to the primary crushing device 22b by the first supplying conveyor 21b via a special-purpose charging table 74, in which they are subjected to a primary crushing operation. The glass bottles are subsequently supplied from the first crushing device 22b to the secondary crushing device 24b and the agitating device 25b which is arranged below the secondary crushing device through the secondary supplying conveyor 23b, in which the materials are subjected to the secondary crushing operation and agitation, and then converted into predetermined shapes. Moreover, materials are transferred from the agitating device 25a to the grid-sorter 27b by means of third supplying conveyor 26b, in which they may be sorted by their grid-sizes, and the products may be contained in predetermined containers respectively according to their grain sizes. Meanwhile, a wind-operated sorter is not present in this vehicle-loadable type glass sand-producing system for reason of space. Reference numerals 30b and 31b represent the dust collector and the switch board respectively.

The charging table 74 is shown when it is loaded on a vehicle, but the charging table 74 may also be installed on land only for a limited period of work, by allowing the first conveyor 21b to extend to the land. By so doing, the need of lifting used glass products up to a cargo carrier on a vehicle can be dispensed with. Furthermore, an auxiliary conveyor may alternatively be used for supplying of used glass products from a land area to the charging table 74 on a vehicle. In this embodiment, it is also possible to dispense with the primary crushing device, and instead the secondary crushing device may be arranged in place of the current primary crushing device, so that only the crushing device is present at a place previously occupied by the current secondary crushing device. It may of course be possible to unload the entire system onto land if so needed, after it is moved by the transferring device 73. Therefore, the entire system may be constructed as one unit so that it may be easily unloaded from the cargo carrier if so required.

Because these is no limit as to sizes of the glass fragments that can be supplied to the secondary crushing device, the need of arranging a device adapted to select crushed glass fragments in the secondary crushing device according to their sizes may be eliminated. Furthermore, the primary crushing device may be omitted, if so required.

Moreover, the crushing chamber 36 is made from special steel with improved wear-resistant and impact-resistant characteristics. Consequently, even if metallic fragments are entrapped in the crushing chamber, there is little risk of the crushing chamber being damaged. Therefore, a co-existence of the metallic lid etc. together with the glass fragments is permitted, whereby eliminating the need for pre-treatment steps such as those of removing the metallic lid etc., beforehand.

Furthermore, ancillary installations such as a sorter for removing glass fragments of dimensions greater than those as predetermined, and a magnetic screening device etc., for preventing entrapment of the metallic fragments may not be needed. Moreover, components may be arranged, for example, in a laminated configuration as shown in FIG. 12, or the primary crushing device may be omitted, and thereby allowing the entire system to be built in a compact configuration with an inexpensive cost.

The device may be made to be transportable to any place as needed, by loading it onto a transferring means, and thus glass sands may be produced at any work site.

What is claims is:

1. A method for producing glass sands, said method comprising:

crushing glass articles, together with foreign materials attached thereto, so as to form glass fragments;

agitating the glass fragments, together with the foreign materials, so as to eliminate sharp edges of the glass fragments and to form the glass fragments into glass sands;

sieving the glass sands so as to separate the glass sands by size and to remove the foreign materials and glass sands that are of a size greater than a predetermined size; and separating, by a wind force, the foreign materials from the glass sands that are of a size greater than the predetermined size.

2. The method for producing glass sands as claimed in claim 1, wherein said step of forming glass fragments by crushing glass articles includes a primary crushing operation and a secondary crushing operation.

* * * * *